United States Patent
Teyeb et al.

(10) Patent No.: US 12,382,330 B2
(45) Date of Patent: Aug. 5, 2025

(54) METHOD, PRODUCT AND APPARATUS FOR TREATING MASTER CELL GROUP, MCG, FAILURE AND RADIO LINK FAILURE, RLF, REPORTING

(71) Applicant: Telefonaktiebolaget LM Ericsson (publ), Stockholm (SE)

(72) Inventors: Oumer Teyeb, Montréal (CA); Pradeepa Ramachandra, Linköping (SE); Antonino Orsino, Kirkkonummi (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 419 days.

(21) Appl. No.: 18/009,594

(22) PCT Filed: Jun. 8, 2021

(86) PCT No.: PCT/EP2021/065223
§ 371 (c)(1),
(2) Date: Dec. 9, 2022

(87) PCT Pub. No.: WO2021/249973
PCT Pub. Date: Dec. 16, 2021

(65) Prior Publication Data
US 2023/0217291 A1    Jul. 6, 2023

Related U.S. Application Data

(60) Provisional application No. 63/037,280, filed on Jun. 10, 2020.

(51) Int. Cl.
H04W 24/08    (2009.01)
H04W 24/10    (2009.01)
(Continued)

(52) U.S. Cl.
CPC ........... *H04W 24/10* (2013.01); *H04W 24/08* (2013.01); *H04W 36/0069* (2018.08);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

2016/0112924 A1    4/2016    Turakhia et al.
2018/0279401 A1    9/2018    Hong et al.

FOREIGN PATENT DOCUMENTS

CN    108632902 A    10/2018
WO    2020/011157 A1    1/2020

OTHER PUBLICATIONS

ZTE Corporation et al., "Discussion on the fast RLF recovery with the applying of CHO and DC", 3GPP TSG RAN WG2 Meeting #107, R2-1910743, Prague, Czech Republic, Aug. 26-30, 2019 (5 pages).
(Continued)

*Primary Examiner* — Timothy J Weidner
(74) *Attorney, Agent, or Firm* — Rothwell, Figg, Ernst & Manbeck, P.C.

(57) ABSTRACT

A method (400) for reporting radio link failure, RLF, information. The method includes a user equipment, UE, detecting (s402) an RLF with respect to a master cell group, MCG. The method also includes, in response to detecting the RLF with respect to the MCG, the UE storing (s404) RLF information. The method also includes the UE sending (s406) a first message comprising MCG failure information, e.g., the RLF information, and activating a timer. The method also includes the UE receiving (s408) a second message after sending the first message and activating the
(Continued)

timer. The method also includes the UE, in response to receiving the second message, determining (s410) that a condition is satisfied, wherein determining that the condition is satisfied comprises at least determining that the timer is still running. The method also includes, as a result of determining that the condition is satisfied, the UE deleting (s412) the RLF information.

13 Claims, 5 Drawing Sheets

(51) Int. Cl.
| | |
|---|---|
| *H04W 36/00* | (2009.01) |
| *H04W 36/30* | (2009.01) |
| *H04W 76/19* | (2018.01) |
| *H04W 76/38* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ......... *H04W 36/305* (2018.08); *H04W 76/19* (2018.02); *H04W 76/38* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ....... H04J 2011/0003–0096; H04W 8/22–245; H04W 24/02–10; H04W 28/02–26; H04W 36/0005–385; H04W 48/02–20; H04W 56/001–0025; H04W 60/005–06; H04W 72/02–569; H04W 76/10–50; H04W 84/02–16; H04W 88/02–12; H04W 92/02–04; H04W 92/10
See application file for complete search history.

(56) References Cited

OTHER PUBLICATIONS

Samsung, "NR RLF Report", 3GPP TSG-RAN WG2 Meeting 3107bis, R2-1912486, Chongqing, China Oct. 14-18, 2019, (4 pages).

Samsung Electronics et al., "Introduction of T312 in NR", 3GPP TSG-RAN WG2 #105 meeting, R2-1902067, Athens, Greece, Jan. 22-26, 2019 (6 pages).

Samsung, Moving reconfiguration with sync to SpCell configuration (38.331 RIL issue S003), 3GPP TSG-RAN WG2 meeting #102, R2-1807831, Busan, Korea May 21-25, 2018 (9 pages).

LG Electronics Inc., "Remaining issue on guard timer setup", 3GPP TSG-RAN WG2 Meeting #109 electronic, R2-2001620, Feb. 24-Mar. 6, 2020 (1 page).

International Search Report and Written Opinion issued in International Application No. PCT/EP2021/065223 dated Sep. 16, 2021 (14 pages).

International Preliminary Report on Patentability with Transmittal issued in International Application No. PCT/EP2021/065223 dated Jun. 9, 2022 (17 pages).

3GPP TS 38.331 V16.0.0, Mar. 2020, Technical Specification, 3rd Generation Partnership Project; Technical Specification Group Radio Access Network; NR; Radio Resource Control (RRC) protocol specification (Release 16), XP051893854 (835 pages).

3GPP TS 36.331 V16.0.0, Mar. 2020, Technical Specification, 3rd Generation Partnership Project; Technical Specification Group Radio Access Network; Evolved Universal Terrestrial Radio Access (E-UTRA); Radio Resource Control (RRC); Protocol specification (Release 16), XP051893852 (1048 pages).

Huawei et al., "Correction on clearing VarRLF-Report regarding T316", R2-2007760, 3GPP TSG-RAN2 Meeting #111 electronic, Online, Aug. 17-28, 2020, XP051912387 (3 pages).

Huawei et al., "Correction on MDT and SON in NR", R2-2006336, 3GPP TSG-RAN WG2 Meeting #110-e, Electronic, Jun. 1-12, 2020, XP051898307 (814 pages).

3GPP Ran2: "3GPP RAN2 Agenda Meeting 110e (electronic)", Jun. 3, 2020, XP055837976 (2 pages).

3GPP TS 37.340 V16.0.0, Dec. 2019, Technical Specification, 3rd Generation Partnership Project; Technical Specification Group Radio Access Network; Evolved Universal Terrestrial Radio Access (E-UTRA) and NR; Multi-connectivity; Stage 2 (Release 16), XP051893890 (72 pages).

Huawei et al., "SON remaining issues", R2-2003247, 3GPP TSG-RAN WG2 Meeting #109bis-e, Online, Apr. 20-30, 2020, XP051871247 (5 pages).

ZTE Corporation et al., "Remaining FFSs for SON in NB-IoT", R2-2003291, 3GPP TSG-RAN WG2 Meeting #109bis e-Meeting, Apr. 20-30, 2020, XP051871279 (17 pages).

3GPP TS 38.423 V16.1.0, Mar. 2020, Technical Specification, 3rd Generation Partnership Project; Technical Specification Group Radio Access Network; NG-RAN; Xn application protocol (XnAP) (Release 16) (334 pages).

3GPP TS 38.401 V15.7.0, Dec. 2019, 3rd Generation Partnership Project; Technical Specification Group Radio Access Network; NG-RAN; Architecture description (Release 15) (47 pages).

3GPP TS 37.340 V16.1.0, Mar. 2020, Technical Specification, 3rd Generation Partnership Project; Technical Specification Group Radio Access Network; Evolved Universal Terrestrial Radio Access (E-UTRA) and NR; Multi-connectivity; Stage 2 (Release 16) (74 pages).

Ericsson, "Fast MCG recovery via SCells of Mcg", 3GPP TSG-RAN WG2 #107, Tdoc R2-1910273, Prague, Czech Republic, Aug. 26-30, 2019 (9 pages).

ZTE Corporation et al., "Discussion on fast RLF recovery when applying CHO and fast MCG recovery", 3GPP TSG RAN WG2 Meeting #109e, R2-2001260, Online, 24th Feb.-Mar. 6, 2020 (3 pages).

METHOD, PRODUCT AND APPARATUS FOR TREATING MASTER CELL GROUP, MCG, FAILURE AND RADIO LINK FAILURE, RLF, REPORTING

CROSS REFERENCE TO RELATED APPLICATIONS

This application is a 35 U.S.C. § 371 National Stage of International Patent Application No. PCT/EP2021/065223, filed Jun. 8, 2021, which claims priority to U.S. provisional patent application No. 63/037,280, filed on Jun. 10, 2020. The above identified applications are incorporated by this reference.

TECHNICAL FIELD

Disclosed are embodiments related to MCG failure reporting and RLF failure reporting.

BACKGROUND

1.1-5G Architecture

The current 5G Radio Access Network (RAN) (Next-Generation RAN) architecture is depicted and described in Technical Specification (TS) 38.401v15.7.0 (www.3gpp.org/ftp//Specs/archive/38_series/38.401/38401470.zip) as shown in FIG. 1.

The NG architecture can be further described as follows. The NG-RAN consists of a set of next generation nodeBs (gNBs) connected to the 5G core (5GC) through the next-generation (NG) interface. A gNB can support frequency division duplex (FDD) mode, time division duplex (TDD) mode or dual mode operation. gNBs can be interconnected through the Xn interface. A gNB may consist of a gNB central unit (gNB-CU) and one or more gNB distributed units (gNB-DU). A gNB-CU and a gNB-DU are connected via F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signalling transport.

Another architectural option is that where an Long Term Evolution (LTE) evolved NodeB (eNB) connected to the Evolved Packet Core network is connected over the X2 interface with a so called NR-gNB. The latter is a gNB not connected directly to a core network (CN) and connected via X2 to an eNB for the sole purpose of performing dual connectivity.

The architecture in FIG. 1 can be expanded by spitting the gNB-CU into two entities. One gNB-CU-User Plane (gNB-CU-UP), which serves the user plane and hosts the packet data convergence protocol (PDCP) protocol and one gNB-CU-CP, which serves the control plane and hosts the PDCP and radio resource control (RRC) protocol. For completeness it should be said that a gNB-DU hosts the radio link control (RLC)/medium access control (MAC)/physical layer (PHY) protocols.

1.2—Mobility Robustness Organization (MRO) and Radio Link Failure (RLF) in LTE/NR Seamless handovers are a key feature of 3rd Generation Partnership Project (3GPP) technologies. Successful handovers ensure that a user equipment (UE) (i.e., any device capable of wireless communication with an access point (e.g. gNB, eNB, etc.) moves around in the coverage area of different cells without causing too much interruptions in the data transmission. However, there will be scenarios when the network fails to handover the UE to the 'correct' neighbor cell in time and in such scenarios the UE will declare the radio link failure (RLF) or Handover Failure (HOF).

Upon HOF and RLF, the UE may take autonomous actions i.e. trying to select a cell and initiate reestablishment procedure so that we make sure the UE is trying to get back as soon as it can, so that it can be reachable again. The RLF will cause a poor user experience as the RLF is declared by the UE only when it realizes that there is no reliable communication channel (radio link) available between itself and the network. Also, reestablishing the connection requires signaling with the newly selected cell (random access procedure, RRC Reestablishment Request, RRC Reestablishment RRC Reestablishment Complete, RRC Reconfiguration and RRC Reconfiguration Complete) and adds some latency, until the UE can exchange data with the network again.

According to the LTE/NR specifications (TS 36.331, TS 38.331), the possible causes for the radio link failure could be one of the following:

1) expiry of the radio link monitoring related timer T310;
2) expiry of the measurement reporting associated timer T312 (not receiving the handover command from the network within this timer's duration despite sending the measurement report when T310 was running);
3) upon reaching the maximum number of RLC retransmissions for the MCG; and
4) upon receiving random access problem indication from the MCG MAC entity.

As RLF leads to reestablishment which degrades performance and user experience, it is in the interest of the network to understand the reasons for RLF and try to optimize mobility related parameters (e.g. trigger conditions of measurement reports) to avoid later RLFs. Before the standardization of MRO related report handling in the network, only the UE was aware of some information associated to how did the radio quality looked like at the time of RLF, what is the actual reason for declaring RLF etc. For the network to identify the reason for the RLF, the network needs more information, both from the UE and also from the neighboring base stations.

As part of the MRO solution in LTE, the RLF reporting procedure was introduced in the RRC specification in Rel-9 RAN2 work. That has impacted the RRC specifications (TS 36.331) in the sense that it was standardized that the UE would log relevant information at the moment of an RLF and later report to a target cell the UE succeeds to connect (e.g. after reestablishment). That has also impacted the inter-gNodeB interface, i.e., X2AP specifications (TS 36.423), as an eNodeB receiving an RLF report could forward to the eNodeB where the failure has been originated.

In LTE/NR, lower layers provide to upper layer Out-of-Sync (OOS) and In-Sync (IS), internally by the UE's physical layer, which in turn may apply RRC/layer 3 (i.e. higher layer) filtering for the evaluation of Radio Link Failure (RLF). The procedure is illustrated in FIG. 2. FIG. 2 shows higher layer RLF related procedures in LTE.

For the RLF report generated by the UE, its contents have been enhanced with more details in the subsequent releases. The measurements included in the measurement report based on the latest LTE RRC specification (3GPP TS 36.331 V12.8.0) are:

1) Measurement quantities (e.g., Reference Signal Received Power (RSRP) and Reference Signal Received Quality (RSRQ)) of the last serving cell (PCell).
2) Measurement quantities of the neighbor cells in different frequencies of different RATs (Universal Terrestrial Radio Access (UTRA), Evolved-UTRA (E-UTRA), Global System for Mobile Communications (GSM) Edge RAN (GERAN), Code-Division Multiple Access (CDMA) 2000).
3) Measurement quantity (Received Signal Strength Indicator (RSSI)) associated to Wireless Local Area Network (WLAN) Aps.
4) Measurement quantity (RSSI) associated to Bluetooth beacons.
5) Location information, if available (including location coordinates and velocity)
6) Globally unique identity of the last serving cell, if available, otherwise the physical cell ID (PCI) and the carrier frequency of the last serving cell.
7) Tracking area code of the PCell.
8) Time elapsed since the last reception of the 'Handover command' message.
9) Cell Radio Network Temporary Identifier (C-RNTI) used in the previous serving cell.
10) Whether or not the UE was configured with a data radio bearer (DRB) having Quality of Service (QoS) Class Identifier (QCI) value of 1.

The detection and logging of the RLF related parameters is captured in section 5.3.11.3 of LTE RRC specification, which is reproduced in the table below.

---

5.3.11.3    Detection of radio link failure
The UE shall:
  1>    upon T310 expiry; or
  1>    upon T312 expiry; or
  1>    upon random access problem indication from MCG MAC while neither T300, T301, T304 nor T311 is running; or
  1>    upon indication from MCG RLC, which is allowed to be send on PCell, that the maximum number of retransmissions has been reached for an SRB or DRB:
      2>    consider radio link failure to be detected for the MCG i.e. RLF;
      2>    except for NB-IoT, store the following radio link failure information in the VarRLF-Report by setting its fields as follows:
         3>    clear the information included in VarRLF-Report, if any;
         3>    set the plmn-IdentityList to include the list of EPLMNs stored by the UE (i.e. includes the RPLMN);
         3>    set the measResultLastServCell to include the RSRP and RSRQ, if available, of the PCell based on measurements collected up to the moment the UE detected radio link failure;
         3>    set the measResultNeighCells to include the best measured cells, other than the PCell, ordered such that the best cell is listed first, and based on measurements collected up to the moment the UE detected radio link failure, and set its fields as follows;
            4>    if the UE was configured to perform measurements for one or more EUTRA frequencies, include the measResultListEUTRA;
            4>    if the UE was configured to perform measurement reporting for one or more neighbouring UTRA frequencies, include the measResultListUTRA;
            4>    if the UE was configured to perform measurement reporting for one or more neighbouring GERAN frequencies, include the measResultListGERAN;
            4>    if the UE was configured to perform measurement reporting for one or more neighbouring CDMA2000 frequencies, include the measResultsCDMA2000;
            4>    for each neighbour cell included, include the optional fields that are available;
NOTE 1:    The measured quantities are filtered by the L3 filter as configured in the mobility measurement configuration. The measurements are based on the time domain measurement resource restriction, if configured. Blacklisted cells are not required to be reported.
         3>    if available, set the logMeasResultListWLAN to include the WLAN measurement results, in order of decreasing RSSI for WLAN APs;
         3>    if available, set the logMeasResultListBT to include the Bluetooth measurement results, in order of decreasing RSSI for Bluetooth beacons;
         3>    if detailed location information is available, set the content of the locationInfo as follows:
            4>    include the locationCoordinates;
            4>    include the horizontalVelocity, if available;
         3>    set the failedPCellId to the global cell identity, if available, and otherwise to the physical cell identity and carrier frequency of the PCell where radio link failure is detected;
         3>    set the tac-FailedPCell to the tracking area code, if available, of the PCell where radio link failure is detected;
         3>    if an RRCConnectionReconfiguration message including the mobilityControlInfo was received before the connection failure:
            4>    if the last RRCConnectionReconfiguration message including the mobilityControlInfo concerned an intra E-UTRA handover:
               a    5>  include the previousPCellId and set it to the global cell identity

|   |   |   |   |   |   | of the PCell where the last RRCConnectionReconfiguration message including mobilityControlInfo was received; |
|---|---|---|---|---|---|---|
|   |   |   |   | b | 5> | set the timeConnFailure to the elapsed time since reception of the last RRCConnectionReconfiguration message including the mobilityControlInfo; |
|   |   |   | 4> |   |   | if the last RRCConnectionReconfiguration message including the mobilityControlInfo concerned a handover to E-UTRA from UTRA and if the UE supports Radio Link Failure Report for Inter-RAT MRO: |
|   |   |   |   | c | 5> | include the previousUTRA-CellId and set it to the physical cell identity, the carrier frequency and the global cell identity, if available, of the UTRA Cell in which the last RRCConnectionReconfiguration message including mobilityControlInfo was received; |
|   |   |   |   | d | 5> | set the timeConnFailure to the elapsed time since reception of the last RRCConnectionReconfiguration message including the mobilityControlInfo; |
|   |   | 3> |   |   |   | if the UE supports QCI1 indication in Radio Link Failure Report and has a DRB for which QCI is 1: |
|   |   |   | 4> |   |   | include the drb-EstablishedWithQCI-1; |
|   |   | 3> |   |   |   | set the connectionFailureType to rlf; |
|   |   | 3> |   |   |   | set the c-RNTI to the C-RNTI used in the PCell; |
|   |   | 3> |   |   |   | set the rlf-Cause to the trigger for detecting radio link failure; |
|   | 2> |   |   |   |   | if AS security has not been activated: |
|   |   | 3> |   |   |   | if the UE is a NB-IoT UE: |
|   |   |   | 4> |   |   | if the UE supports RRC connection re-establishment for the Control Plane CIoT EPS optimisation: |
|   |   |   |   | e | 5> | initiate the RRC connection re-establishment procedure as specified in 5.3.7; |
|   |   |   | 4> |   |   | else: |
|   |   |   |   | f | 5> | perform the actions upon leaving RRC_CONNECTED as specified in 5.3.12, with release cause 'RRC connection failure'; |
|   |   | 3> |   |   |   | else: |
|   |   |   | 4> |   |   | perform the actions upon leaving RRC_CONNECTED as specified in 5.3.12, with release cause 'other'; |
|   | 2> |   |   |   |   | else: |
|   |   | 3> |   |   |   | initiate the connection re-establishment procedure as specified in 5.3.7; |

In case of DC, the UE shall:
1> upon T313 expiry; or
1> upon random access problem indication from SCG MAC; or
1> upon indication from SCG RLC, which is allowed to be sent on PSCell, that the maximum number of retransmissions has been reached for an SCG or split DRB:
    2> consider radio link failure to be detected for the SCG i.e. SCG-RLF;
    2> initiate the SCG failure information procedure as specified in 5.6.13 to report SCG radio link failure;
In case of CA PDCP duplication, the UE shall:
1> upon indication from an RLC entity, which is restricted to be sent on SCell only, that the maximum number of retransmissions has been reached:
    2> consider radio link failure to be detected for the RLC entity;
    2> initiate the failure information procedure as specified in 5.6.21 to report PDCP duplication failure;
The UE may discard the radio link failure information, i.e. release the UE variable VarRLF-Report, 48 hours after the radio link failure is detected, upon power off or upon detach.

After the RLF is declared, the RLF report is logged and, once the UE selects a cell and succeeds with a reestablishment, it includes an indication that it has an RLF report available in the RRC Reestablishment Complete message, to make the target cell aware of that availability. Then, upon receiving an UEInformationRequest message with a flag "rlf-ReportReq-r9" the UE shall include the RLF report (stored in a UE variable VarRLF-Report, as described above) in an UEInformationResponse message and send to the network.

The UEInformationRequest and UEInformationResponse messages are described below.

UEInformationRequest—The UEInformationRequest is the command used by E-UTRAN to retrieve information from the UE. The signalling radio bearer for the message is SRB1; the RLC-SAP is AM; the Logical channel is DCCH, and the direction is E-UTRAN to UE.

The below table illustrates various UEInformationRequest messages:

```
-- ASN1START
UEInformationRequest-r9      ::=             SEQUENCE {
    rrc-TransactionIdentifier      RRC-TransactionIdentifier,
    criticalExtensions             CHOICE {
       c1                                  CHOICE {
          ueInformationRequest-r9               UEInformationRequest-r9-IEs,
          spare3 NULL, spare2 NULL, spare1 NULL
       },
       criticalExtensionsFuture            SEQUENCE { }
    }
}
```

```
-- ASN1START
UEInformationRequest-r9-IEs ::=    SEQUENCE {
    rach-ReportReq-r9              BOOLEAN,
    rlf-ReportReq-r9               BOOLEAN,
    nonCriticalExtension           UEInformationRequest-v930-IEs      OPTIONAL
}
UEInformationRequest-v930-IEs :: = SEQUENCE {
    lateNonCriticalExtension       OCTET STRING                        OPTIONAL,
    nonCriticalExtension           UEInformationRequest-v1020-IEs      OPTIONAL
}
UEInformationRequest-v1020-IEs ::= SEQUENCE {
    logMeasReportReq-r10           ENUMERATED {true}
    OPTIONAL,  -- Need ON
    nonCriticalExtension           UEInformationRequest-v1130-IEs      OPTIONAL
}
UEInformationRequest-v1130-IEs ::= SEQUENCE {
    connEstFailReportReq-r11       ENUMERATED {true}
    OPTIONAL,  -- Need ON
    nonCriticalExtension           UEInformationRequest-v1250-IEs      OPTIONAL
}
UEInformationRequest-v1250-IEs :: = SEQUENCE {
    mobilityHistoryReportReq-r12   ENUMERATED {true}
    OPTIONAL,  -- Need ON
    nonCriticalExtension           UEInformationRequest-v1530-IEs      OPTIONAL
}
UEInformationRequest-v1530-IEs :: = SEQUENCE {
    idleModeMeasurementReq-r15     ENUMERATED {true}
    OPTIONAL,  -- Need ON
    flightPathInfoReq-r15          FlightPathInfoReportConfig-r15      OPTIONAL,
    -- Need ON
    nonCriticalExtension           SEQUENCE { }
    OPTIONAL
}
-- ASN1STOP
```

UEInformationRequest field descriptions—rach-ReportReq: This field is used to indicate whether the UE shall report information about the random access procedure.

UEInformationResponse

The UEInformationResponse message is used by the UE to transfer the information requested by the E-UTRAN. The signalling radio bearer for the UEInformationResponse is SRB1 or SRB2 (when logged measurement information is included); the RLC-SAP is AM; the Logical channel is DCCH; and the direction is UE to E-UTRAN.

The table below illustrates various UEInformationResponse messages.

```
-- ASN1START
UEInformationResponse-r9::=        SEQUENCE {
    rrc-TransactionIdentifier      RRC-TransactionIdentifier,
    criticalExtensions             CHOICE {
        c1                         CHOICE {
            ueInformationResponse-r9         UEInformationResponse-r9-IEs,
            spare3 NULL, spare2 NULL, spare1 NULL
        },
        criticalExtensionsFuture   SEQUENCE { }
    }
}
UEInformationResponse-r9-IEs ::=   SEQUENCE {
    rach-Report-r9                 SEQUENCE {
        numberOfPreambles Sent-r9      NumberOfPreamblesSent-r11,
        contentionDetected-r9          BOOLEAN
    }                                                              OPTIONAL
    rlf-Report-r9                  RLF-Report-r9      OPTIONAL,
    nonCriticalExtension           UEInformationResponse-v930-IEs
    OPTIONAL
}
- - Late non critical extensions
UEInformationResponse-v9e0-IEs ::= SEQUENCE {
    rlf-Report-v9e0                RLF-Report-v9e0                     OPTIONAL,
    nonCriticalExtension           SEQUENCE { }                        OPTIONAL
}
-- Regular non critical extensions
UEInformationResponse-v930-IEs ::= SEQUENCE {
    lateNonCriticalExtension       OCTET STRING (CONTAINING
    UEInformationResponse-v9e0-IEs) OPTIONAL,
    nonCriticalExtension           UEInformationResponse-v1020-IEs
    OPTIONAL
}
UEInformationResponse-v1020-IEs ::= SEQUENCE {
    logMeasReport-r10              LogMeasReport-r10                   OPTIONAL,
```

```
    nonCriticalExtension              UEInformationResponse-v1130-IEs
        OPTIONAL
}
UEInformationResponse-v1130-IEs ::=  SEQUENCE {
    connEstFailReport-r11             ConnEstFailReport-r11        OPTIONAL,
    nonCriticalExtension              UEInformationResponse-v1250-IEs    OPTIONAL
}
UEInformationResponse-v1250-IEs ::=  SEQUENCE {
    mobilityHistoryReport-r12         MobilityHistoryReport-r12    OPTIONAL,
    nonCriticalExtension              UEInformationResponse-v1530-IEs    OPTIONAL
}
UEInformationResponse-v1530-IEs ::=  SEQUENCE {
    measResultListIdle-r15            MeasResultListIdle-r15       OPTIONAL,
    flightPathInfoReport-r15          FlightPathInfoReport-r15     OPTIONAL,
    nonCriticalExtension              SEQUENCE { }                          OPTIONAL
}
RLF-Report-r9::=                   SEQUENCE {
    measResultLastServCell-r9          SEQUENCE {
        rsrpResult-r9                     RSRP-Range,
        rsrqResult-r9                     RSRQ-Range         OPTIONAL
    },
    measResultNeighCells-r9            SEQUENCE {
        measResultListEUTRA-r9            MeasResultList2EUTRA-r9
    OPTIONAL,
        measResultListUTRA-r9             MeasResultList2UTRA-r9
    OPTIONAL,
        measResultListGERAN-r9            MeasResultListGERAN
    OPTIONAL,
        measResultsCDMA2000-r9            MeasResultList2CDMA2000-r9
    OPTIONAL
    } OPTIONAL,
    ...,
    [[ locationInfo-r10              LocationInfo-r10      OPTIONAL,
       failedPCellId-r10             CHOICE {
           cellGlobalId-r10             CellGlobalIdEUTRA,
           pci-arfcn-r10                SEQUENCE {
               physCellId-r10              PhysCellId,
               carrierFreq-r10             ARFCN-ValueEUTRA
           }
       }                                             OPTIONAL,
       reestablishmentCellId-r10     CellGlobalIdEUTRA          OPTIONAL,
       timeConnFailure-r10           INTEGER (0..1023)          OPTIONAL,
       connectionFailureType-r10     ENUMERATED {rlf, hof}      OPTIONAL,
       previousPCellId-r10           CellGlobalIdEUTRA                 OPTIONAL
    ]],
    [[ failedPCellId-v1090           SEQUENCE {
           carrierFreq-v1090           ARFCN-ValueEUTRA-v9e0
       }                                             OPTIONAL
    ]],
    [[ basicFields-r11                  SEQUENCE {
           c-RNTI-r11                     C-RNTI,
           rlf-Cause-r11                  ENUMERATED {
                                              t310-Expiry, randomAccessProblem,
                                              rlc-MaxNumRetx, t312-Expiry-r12},
           timeSinceFailure-r11           TimeSinceFailure-r11
       }                                             OPTIONAL,
       previousUTRA-CellId-r11           SEQUENCE {
           carrierFreq-r11                 ARFCN-ValueUTRA,
           physCellId-r11                  CHOICE {
               fdd-r11                        PhysCellIdUTRA-FDD,
               tdd-r11                        PhysCellIdUTRA-TDD
           },
           cellGlobalId-r11                CellGlobalIdUTRA     OPTIONAL
       }                                                    OPTIONAL
       selectedUTRA-CellId-r11           SEQUENCE {
           carrierFreq-r11                 ARFCN-ValueUTRA,
           physCellId-r11                  CHOICE {
               fdd-r11                        PhysCellIdUTRA-FDD,
               tdd-r11                        PhysCellIdUTRA-TDD
           }
       }                                             OPTIONAL
    ]],
    [[ failedPCellId-v1250            SEQUENCE {
           tac-FailedPCell-r12            TrackingAreaCode
       }                                             OPTIONAL,
       measResultLastServCell-v1250RSRQ-Range-v1250            OPTIONAL,
       lastServCellRSRQ-Type-r12         RSRQ-Type-r12            OPTIONAL,
       measResultListEUTRA-v1250         MeasResultList2EUTRA-v1250
    OPTIONAL
```

```
    ]],
    [[ drb-EstablishedWithQCI-1-r13      ENUMERATED {qci1}
    OPTIONAL
    ]],
    [[ measResultLastServCell-v1360      RSRP-Range-v1360
    OPTIONAL
    ]],
    [[ logMeasResultListBT-r15           LogMeasResultListBT-r15      OPTIONAL,
       logMeasResultListWLAN-r15         LogMeasResultListWLAN-r15               OPTIONAL
    ]]
}
RLF-Report-v9e0 ::=              SEQUENCE {
    measResultListEUTRA-v9e0             MeasResultList2EUTRA-v9e0
}
MeasResultList2EUTRA-r9 ::=              SEQUENCE (SIZE (1..maxFreq)) OF
MeasResult2EUTRA-r9
MeasResultList2EUTRA-v9e0 ::=            SEQUENCE (SIZE (1..maxFreq)) OF
MeasResult2EUTRA-v9e0
MeasResultList2EUTRA-v1250 ::=           SEQUENCE (SIZE (1..maxFreq)) OF
MeasResult2EUTRA-v1250
MeasResult2EUTRA-r9 ::=           SEQUENCE {
    carrierFreq-r9                   ARFCN-ValueEUTRA,
    measResultList-r9                MeasResultListEUTRA
}
MeasResult2EUTRA-v9e0 ::=         SEQUENCE {
    carrierFreq-v9e0                 ARFCN-ValueEUTRA-v9e0        OPTIONAL
}
MeasResult2EUTRA-v1250 ::=        SEQUENCE {
    rsrq-Type-r12                    RSRQ-Type-r12   OPTIONAL
}
MeasResultList2UTRA-r9 ::=        SEQUENCE (SIZE (1..maxFreq)) OF
MeasResult2UTRA-r9
MeasResult2UTRA-r9 ::=            SEQUENCE {
    carrierFreq-r9                   ARFCN-ValueUTRA,
    measResultList-r9                MeasResultListUTRA
}
MeasResultList2CDMA2000-r9 ::=    SEQUENCE (SIZE (1..maxFreq)) OF
MeasResult2CDMA2000-r9
MeasResult2CDMA2000-r9 ::=        SEQUENCE {
    carrierFreq-r9                   CarrierFreqCDMA2000,
    measResultList-r9                MeasResultsCDMA2000
}
LogMeasReport-r10 ::=            SEQUENCE {
    absoluteTimeStamp-r10                AbsoluteTimeInfo-r10,
    traceReference-r10               TraceReference-r10,
    traceRecordingSessionRef-r10     OCTET STRING (SIZE (2)),
    tce-Id-r10                       OCTET STRING (SIZE (1)),
    logMeasInfoList-r10                  LogMeasInfoList-r10,
    logMeasAvailable-r10             ENUMERATED {true}                OPTIONAL,
    ...,
    [[ logMeasAvailableBT-r15        ENUMERATED {true}
    OPTIONAL,
       logMeasAvailableWLAN-r15      ENUMERATED {true}
    OPTIONAL
    ]]
}
LogMeasInfoList-r10 ::=     SEQUENCE (SIZE (1..maxLogMeasReport-r10)) OF
LogMeasInfo-r10
LogMeasInfo-r10 :: =    SEQUENCE {
    locationInfo-r10                 LocationInfo-r10    OPTIONAL,
    relativeTimeStamp-r10            INTEGER (0..7200),
    servCellIdentity-r10             CellGlobalIdEUTRA,
    measResultServCell-r10               SEQUENCE {
        rsrpResult-r10                   RSRP-Range,
        rsrqResult-r10                   RSRQ-Range
    },
    measResultNeighCells-r10         SEQUENCE {
        measResultListEUTRA-r10              MeasResultList2EUTRA-r9
    OPTIONAL,
        measResultListUTRA-r10           MeasResultList2UTRA-r9       OPTIONAL,
        measResultListGERAN-r10              MeasResultList2GERAN-r10
    OPTIONAL,
        measResultListCDMA2000-r10           MeasResultList2CDMA2000-r9
    OPTIONAL
    } OPTIONAL,
    ...,
    [[ measResultListEUTRA-v1090         MeasResultList2EUTRA-v9e0        OPTIONAL
    ]],
    [[ measResultListMBSFN-r12                   MeasResultListMBSFN-r12
```

```
            OPTIONAL,
    measResultServCell-v1250        RSRQ-Range-v1250            OPTIONAL,
    servCellRSRQ-Type-r12           RSRQ-Type-r12               OPTIONAL,
    measResultListEUTRA-v1250       MeasResultList2EUTRA-v1250
OPTIONAL
]],
[[ inDeviceCoexDetected-r13        ENUMERATED {true}           OPTIONAL
]],
[[ measResultServCell-v1360        RSRP-Range-v1360            OPTIONAL
]],
[[ logMeasResultListBT-r15         LogMeasResultListBT-r15     OPTIONAL,
    logMeasResultListWLAN-r15      LogMeasResultListWLAN-r15
OPTIONAL
]]
}
MeasResultListMBSFN-r12 ::=        SEQUENCE (SIZE (1..maxMBSFN-Area)) OF
MeasResultMBSFN-r12
MeasResultMBSFN-r12 ::=            SEQUENCE {
    mbsfn-Area-r12                     SEQUENCE {
        mbsfn-AreaId-r12-                  MBSFNAreaId-r12,
        carrierFreq-r12                    ARFCN-ValueEUTRA-r9
    },
    rsrpResultMBSFN-r12                RSRP-Range,
    rsrqResultMBSFN-r12                MBSFN-RSRQ-Range-r12,
    signallingBLER-Result-r12          BLER-Result-r12             OPTIONAL,
    dataBLER-MCH-ResultList-r12        DataBLER-MCH-ResultList-r12
OPTIONAL,
    ...
}
DataBLER-MCH-ResultList-r12 ::=    SEQUENCE (SIZE (1.. maxPMCH-
PerMBSFN)) OF DataBLER-MCH-Result-r12
DataBLER-MCH-Result-r12 ::=        SEQUENCE {
    mch-Index-r12                      INTEGER (1..maxPMCH-PerMBSFN),
    dataBLER-Result-r12                BLER-Result-r12
}
BLER-Result-r12 ::=                SEQUENCE {
    bler-r12                           BLER-Range-r12,
    blocksReceived-r12                 SEQUENCE {
        n-r12                              BIT STRING (SIZE (3)),
        m-r12                              BIT STRING (SIZE (8))
    }
}
BLER-Range-r12 ::=                 INTEGER(0..31)
MeasResultList2GERAN-r10 ::=       SEQUENCE (SIZE (1..maxCellListGERAN)) OF
MeasResultListGERAN
ConnEstFailReport-r11 ::=          SEQUENCE {
    failedCellId-r11                   CellGlobalIdEUTRA,
    locationInfo-r11                   LocationInfo-r10            OPTIONAL,
    measResultFailedCell-r11           SEQUENCE {
        rsrpResult-r11                     RSRP-Range,
        rsrqResult-r11                     RSRQ-Range                  OPTIONAL
    },
    measResultNeighCells-r11           SEQUENCE {
        measResultListEUTRA-r11            MeasResultList2EUTRA-r9
OPTIONAL,
        measResultListUTRA-r11             MeasResultList2UTRA-r9
OPTIONAL,
        measResultListGERAN-r11            MeasResultListGERAN
OPTIONAL,
        measResultsCDMA2000-r11            MeasResultList2CDMA2000-r9
OPTIONAL
    } OPTIONAL,
    numberOfPreamblesSent-r11          NumberOfPreamblesSent-r11,
    contentionDetected-r11         BOOLEAN,
    maxTxPowerReached-r11              BOOLEAN,
    timeSinceFailure-r11           TimeSinceFailure-r11,
    measResultListEUTRA-v1130          MeasResultList2EUTRA-v9e0   OPTIONAL,
    ...,
    [[ measResultFailedCell-v1250      RSRQ-Range-v1250            OPTIONAL,
       failedCellRSRQ-Type-r12         RSRQ-Type-r12               OPTIONAL,
       measResultListEUTRA-v1250       MeasResultList2EUTRA-v1250
OPTIONAL
    ]],
    [[ measResultFailedCell-v1360      RSRP-Range-v1360            OPTIONAL
    ]],
    [[ logMeasResultListBT-r15         LogMeasResultListBT-r15     OPTIONAL,
       logMeasResultListWLAN-r15       LogMeasResultListWLAN-r15   OPTIONAL
    ]]
}
```

```
NumberOfPreamblesSent-r11 ::=            INTEGER (1..200)
TimeSinceFailure-r11 ::=                 INTEGER (0..172800)
MobilityHistoryReport-r12 ::=    VisitedCellInfoList-r12
FlightPathInfoReport-r15 ::=     SEQUENCE {
    flightPath-r15      SEQUENCE (SIZE (1..maxWayPoint-r15)) OF WayPointLocation-r15
        OPTIONAL,
    nonCriticalExtension              SEQUENCE { }
        OPTIONAL
}
WayPointLocation-r15 ::=         SEQUENCE {
    wayPointLocation-r15                    LocationInfo-r10,
    timeStamp-r15                           AbsoluteTimeInfo-r10       OPTIONAL
}
-- ASN1STOP
```

Based on the contents of the RLF report (e.g. the Globally unique identity of the last serving cell, where the failure was originated), the cell in which the UE reestablishes can forward the RLF report to the last serving cell. This forwarding of the RLF report is done to aid the original serving cell with tuning of the handover related parameters (e.g. measurement report triggering thresholds) as the original serving cell was the one who had configured the parameters associated to the UE that led to the RLF.

Two different types of inter-node messages have been standardized in LTE for that purpose, the Radio link failure indication and the handover report (in 36.423 REFERENCE).

The Radio link failure indication procedure is used to transfer information regarding RRC re-establishment attempts or received RLF reports between eNBs. This message is sent from the eNB in which the UE performs reestablishment to the eNB which was the previous serving cell of the UE.

1.3 MCG Fast Recovery Procedure

In LTE/NR rel-16, the fast MCG link recovery procedure was agreed. Fast MCG link recovery is an RRC procedure where the UE sends an MCG Failure Information message to the Master Node (MN) via the Secondary Cell Group (SCG) upon the detection of a radio link failure on the MCG, instead of triggering RRC re-establishment.

If radio link failure is detected for MCG, and fast MCG link recovery is configured, the UE triggers fast MCG link recovery. Otherwise, the UE initiates the RRC connection re-establishment procedure. During fast MCG link recovery, the UE suspends MCG transmissions for all radio bearers and reports the failure with MCG Failure Information message to the MN via the SCG, using the SCG leg of split Signaling Radio Bearer (SRB)1 or SRB3.

The UE includes in the MCG Failure Information message the measurement results available according to current measurement configuration of both the MN and the Secondary Node (SN). Once the fast MCG link recovery is triggered, the UE maintains the current measurement configurations from both the MN and the SN, and continues measurements based on configuration from the MN and the SN, if possible. The UE initiates the RRC connection re-establishment procedure if it does not receive an RRC reconfiguration message or RRC release message within a certain time (determined by a timer called T316) after fast MCG link recovery was initiated.

Upon reception of the MCG Failure Information, the MN can send RRC reconfiguration message or RRC release message to the UE, using the SCG leg of split SRB1 or SRB3. Upon receiving an RRC reconfiguration message (that contains the reconfigurationWithSync in case the MCG was NR or a mobilityControlInfo in case the MCG was LTE), the UE resumes MCG transmissions for all radio bearers. Upon receiving an RRC release message, the UE releases all the radio bearers and configurations.

It has also been agreed that the network can send an inter-RAT handover (HO) command to the UE in response to the MCG Failure Information. That is, in case the MCG was NR (NR-DC, NE-DC), the UE may receive a MobilityFromNR command containing an RRCConnectionReconfiguration message embedded within it that will be used to hand the UE over to LTE. If the MCG was LTE ((NG)EN-DC), the UE may receive a MobilityFromEUTRA command containing an RRCReconfiguration message embedded within it that will be used to hand the UE over to NR.

The structure of the MCGFailureInformation message is shown below (see also 3GPP TS 38.331, V16.0.0 (hereafter "TS38.331")). As can be seen, the message contains several measurement results the UE has (NR and LTE measurements, both based on the MN/SN measurement configuration).

MCGFailureInformation message

```
-- ASN1START
-- TAG-MCGFAILUREINFORMATION-START
MCGFailureInformation-r16 ::= SEQUENCE {
    criticalExtensions          CHOICE {
        mcgFailureInformation-r16       MCGFailureInformation-r16-IEs,
        criticalExtensionsFuture        SEQUENCE { }
    }
}
MCGFailureInformation-r16-IEs ::=   SEQUENCE {
    failureReportMCG-r16        FailureReportMCG-r16        OPTIONAL,
    nonCriticalExtension        SEQUENCE { } OPTIONAL
}
FailureReportMCG-r16 ::=    SEQUENCE {
```

-continued

| MCGFailureInformation message |
|---|
| failureType-r16      ENUMERATED {t310-Expiry, randomAccessProblem, rlc-MaxNumRetx, spare},<br>    measResultFreqList-r16      MeasResultList2NR      OPTIONAL,<br>    measResultFreqListEUTRA-r16  MeasResultList2EUTRA  OPTIONAL,<br>    measResultSCG-r16       OCTET STRING (CONTAINING MeasResultSCG-Failure) OPTIONAL,<br>    measResultSCG-EUTRA-r16 OCTET STRING      OPTIONAL,<br>    ...<br>}<br>MeasResultList2EUTRA ::=  SEQUENCE (SIZE (1. .maxNrofServingCellsEUTRA)) OF MeasResult2EUTRA<br>-- TAG-MCGFAILUREINFORMATION-STOP<br>-- ASN1STOP |

The MCGFailureInformation message is used to provide information regarding NR MCG failures detected by the UE and has the following characteristics Signalling radio bearer: SRB1; RLC-SAP: AM; Logical channel: DCCH; Direction: UE to Network. The table below provides a description for the elements of the message.

| MCGFailureInformation field descriptions |
|---|
| measResultFreqList<br>The field contains available results of measurements on NR frequencies the UE is configured to measure by the measConfig associated with the MCG.<br>measResultFreqListEUTRA<br>The field contains available results of measurements on E-UTRA frequencies the UE is configured to measure by measConfig associated with the MCG.<br>measResultSCG<br>The field contains the MeasResultSCG-Failure IE which includes available measurement results on NR frequencies the UE is configured to measure by the measConfig associated with the SCG.<br>measResultSCG-EUTRA<br>The field contains the EUTRA MeasResultSCG-FailureMRDC IE which includes available results of measurements on E-UTRA frequencies the UE is configured to measure by the E-UTRA RRCConnectionReconfiguration message as specified in TS 36.331 [10]. |

Detection of Radio Link Failure

As specified in section 5.3.10.3 of TS 38.331:

```
5.3.10.3 Detection of radio link failure
The UE shall:
    1>   if dapsConfig is configured for any DRB:
            2>   upon T310 expiry in source; or
            2>   upon random access problem indication from source MCG MAC; or
            2>   upon indication from source MCG RLC that the maximum number of
         retransmissions has been reached:
                    3>   consider radio link failure to be detected for the source MCG
                         i.e. source RLF;
                            4>   suspend all DRBs in the source;
                            4>   release the source connection.
    1>   else:
            2>   upon T310 expiry in PCell; or
            2>   upon T312 expiry in PCell; or
            2>   upon random access problem indication from MCG MAC while neither
                 T300, T301, T304, T311 nor T319 are running; or
            2>   upon indication from MCG RLC that the maximum number of
                 retransmissions has been reached; or
            2>   if connected as an IAB-node, upon BH RLF indication received on BAP
                 entity from the MCG; or
            2>   upon indication of consistent uplink LBT failures from MCG MAC:
                    3>   if the indication is from MCG RLC and CA duplication is
                         configured and activated, and for the corresponding logical
                         channel allowedServingCells only includes SCell(s):
                            4>   initiate the failure information procedure as specified in
                                 5.7.5 to report RLC failure.
                    3> else:
                            4>   consider radio link failure to be detected for the MCG i.e.
                                 RLF;
                            4>   discard any segments of segmented RRC messages received;
                            4>   store the following radio link failure information in the
                                 VarRLF-Report by setting its fields as follows:
                                    5>   clear the information included in VarRLF-Report, if any;
                                    5>   set the plmn-IdentityList to include the list of EPLMNs
                                         stored by the UE (i.e. includes the RPLMN);
                                    5>   set the measResultLastServCell to include the RSRP, RSRQ and
                                         the available SINR, of the source PCell based on the
                                         available SSB and CSI-RS measurements collected up to the
                                         moment the UE detected radio link failure;
```

-continued

5> set the ssbRLMConfigBitmap and/or csi-rsRLMConfigBitmap in measResultLastServCell to include the radio link monitoring configuration of the source PCell;
        5> for each of the configured NR frequencies in which measurements are available:
          6> if the SS/PBCH block-based measurement quantities are available:
            7> set the measResultListNR in measResultNeighCells to include all the available measurement quantities of the best measured cells, other than the source PCell, ordered such that the cell with highest SS/PBCH block RSRP is listed first if SS/PBCH block RSRP measurement results are available, otherwise the cell with highest SS/PBCH block RSRQ is listed first if SS/PBCH block RSRQ measurement results are available, otherwise the cell with highest SS/PBCH block SINR is listed first, based on the available SS/PBCH block based measurements collected up to the moment the UE detected radio link failure;
              8> for each neighbour cell included, include the optional fields that are available;
          6> if the CSI-RS based measurement quantities are available:
            7> set the measResultListNR in measResultNeighCells to include all the available measurement quantities of the best measured cells, other than the source PCell, ordered such that the cell with highest CSI-RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected radio link failure;
              8> for each neighbour cell included, include the optional fields that are available;
        5> for each of the configured EUTRA frequencies in which measurements are available:
          6> set the measResultListEUTRA in measResultNeighCells to include the best measured cells ordered such that the cell with highest RSRP is listed first if RSRP measurement results are available, otherwise the cell with highest RSRQ is listed first, and based on measurements collected up to the moment the UE detected radio link failure;

NOTE: The measured quantities are filtered by the L3 filter as configured in the mobility measurement configuration. The measurements are based on the time domain measurement resource restriction, if configured. Blacklisted cells are not required to be reported.

5> if detailed location information is available, set the content of locationInfo as follows:
          6> if available, set the commonLocationInfo to include the detailed location information;
          6> if available, set the bt-LocationInfo in locationInfo to include the Bluetooth measurement results, in order of decreasing RSSI for Bluetooth beacons;
          6> if available, set the wlan-LocationInfo in locationInfo to include the WLAN measurement results, in order of decreasing RSSI for WLAN APS;
          6> if available, set the sensor-LocationInfo in locationInfo to include the sensor measurement results;
        5> set the failedPCellId to the global cell identity and the tracking area code, if available, and otherwise to the physical cell identity and carrier frequency of the PCell where radio link failure is detected;
        5> if an RRCReconfiguration message including the reconfigurationWithSync was received before the connection failure:
          6> if the last RRCReconfiguration message including the reconfigurationWithSync concerned an intra NR handover:
            7> include the previousPCellId and set it to the global cell identity and the tracking area code of the PCell where the last RRCReconfiguration message including reconfigurationWithSync was received;
            7> set the timeConnFailure to the elapsed time since reception of the last RRCReconfiguration message including the reconfigurationWithSync;
        5> set the connectionFailureType to rlf;
        5> set the c-RNTI to the C-RNTI used in the PCell;
        5> set the rlf-Cause to the trigger for detecting radio link failure;
        5> if the rlf-Cause is set to randomAccessProblem or -continued beamFailureRecoveryFailure:
6> set the absoluteFrequencyPointA to indicate the absolute
frequency of the reference resource block associated to the
random-access resources;
6> set the locationAndBandwidth and subcarrierSpacing
associated to the UL BWP of the random-access resources;
6> set the msg1-FrequencyStart, msg1-FDM and msg1-
SubcarrierSpacing associated to the random-access
resources;
6> set the parameters associated to individual random-access
attempt in the chronological order of attmepts in the
perRAInfoList as follows:
  7> if the random-access resource used is associated to a
  SS/PBCH block, set the associated random-access
  parameters for the successive random-access attempts
  associated to the same SS/PBCH block for one or more
  radom-access attempts as follows:
    8> set the ssb-Index to include the SS/PBCH block index
    associated to the used random-access resource;
    8> set the numberOfPreamblesSentOnSSB to indicate the
    number of successive random access attempts associated
    to the SS/PBCH block;
    8> for each random-access attempt performed on the
    random-access resource, include the following
    parameters in the chronological order of the random-
    access attempt:
      9> if contention resolution was not successful as
      specified in TS 38.321 [6] for the transmitted
      preamble:
      10> set the contentionDetected to true;
      9> else:
        10> set the contentionDetected to false;
      9> if the SS/PBCH block RSRP of the SS/PBCH block
      corresponding to the random-access resource used in
      the random-access attempt is above rsrp-
      ThresholdSSB:
        10> set the dlRSRPAboveThreshold to true;
      9> else:
        10> set the dlRSRPAboveThreshold to false;
  7> else if the random-access resource used is associated to
  a CSI-RS, set the associated random-access parameters for
  the successive random-access attempts associated to the
  same CSI-RS for one or more radom-access attempts as
  follows:
    8> set the csi-RS-Index to include the CSI-RS index
    associated to the used random-access resource;
    8> set the numberOfPreamblesSentOnCSI-RS to indicate the
    number of successive random-access attempts associated
    to the CSI-RS;
    8> for each random-access attempt performed on the
    random-access resource, include the following
    parameters in the chronological order of the random-
    access attempt:
      9> if contention resolution was not successful as
      specified in TS 38.321 [6] for the transmitted
      preamble:
        10> set the contentionDetected to true;
      9> else:
        10> set the contentionDetected to false;
      9> if the CSI-RS RSRP of the CSI-RS corresponding to
      the random-access resource used in the random-access
      attempt is above rsrp-ThresholdCSI-RS:
        10> set the dlRSRPAboveThreshold to true;
      9> else:
        10> set the dlRSRPAboveThreshold to false;
4> if AS security has not been activated:
5> perform the actions upon going to RRC_IDLE as specified in
  5.3.11, with release cause 'other';-
4> else if AS security has been activated but SRB2 and at least
one DRB have not been setup:
5> perform the actions upon going to RRC_IDLE as specified in
  5.3.11, with release cause 'RRC connection failure';
Editor's note: FFS if the check for SRB2 activation and the
setup of one DRB is applicable to IAB nodes.
4> else:
5> if T316 is configured; and
5> if SCG transmission is not suspended; and
5> if PSCell change is not ongoing (i.e. timer T304 for the NR
  PSCell is not running in case of NR-DC or timer T307 of the E-UTRA PSCell is not running as specified in TS 36.331 [10], clause 5.3.10.10, in NE-DC):
    6> initiate the MCG failure information procedure as
        specified in 5.7.3b to report MCG radio link failure.
  5> else:
    6> initiate the connection re-establishment procedure as
        specified in 5.3.7.

SUMMARY

As discussed above, in LTE/NR rel-16, the MCG fast recovery procedure is being specified such that a UE, instead of initiating a re-establishment procedure when the UE detects an RLF with respect to an MCG, the UE sends an MCG failure information report to the MN using the SCG leg of split SRB1 or SRB3. According to current procedure specified in TS 38.331 subclause 5.3.10.3 (reproduced above), the UE generates an RLF report when a radio link failure on the MCG is detected.

Thus, even if the network has received and responded to the MCG failure (e.g. RRCConfiguration including reconfigurationWithSync is received), the UE may still indicate (e.g. in the RRCReconfigurationComplete message in response to the received reconfiguration that recovered the MCG) about the availability of RLF report at the UE. The network then sends a UE information Request to request the RLF report, which the UE sends in a UE information response message. This means that the UE reports the measurements related to the problem that led to the MCG failure recovery twice (first in the MCG failure Information, and next in the RLF report to the network). Apart from the double sending of the same measurement report to the network, the RLF report is usually gathered for SON/MDT purposes, which is aggregated and analysed for HO/mobility parameter tuning. Thus, sending the RLF report for an MCG failure that has already been recovered could cause some complications (e.g. network changing values of parameters unnecessarily/incorrectly, possibly increasing the chances of RLFs or handover failures in the future).

Accordingly, in one aspect there is provided a method for reporting radio link failure (RLF) information. The method includes a user equipment (UE) detecting an RLF with respect to a master cell group (MCG). The method also includes, in response to detecting the RLF with respect to the MCG, the UE storing RLF information. The method also includes the UE activating a timer and sending a first message comprising MCG failure information (e.g., the RLF information). The method also includes the UE receiving a second message after sending the first message and activating the timer. The method also includes the UE, in response to receiving the second message, determining that a condition is satisfied, wherein determining that the condition is satisfied comprises at least determining that the timer is still running. The method also includes, as a result of determining that the condition is satisfied, the UE deleting the RLF information In another aspect there is provided a computer program comprising instructions which when executed by processing circuitry of a UE causes the UE to perform the any of the methods disclosed herein. In one embodiment, there is provided a carrier containing the computer program wherein the carrier is one of an electronic signal, an optical signal, a radio signal, and a computer readable storage medium. In another aspect there is provided a UE that is configured to perform the methods disclosed herein. The UE may include memory and processing circuitry coupled to the memory.

The advantages of the above described method include: 1) The UE will not report redundant measurement report related to a failure that has already been recovered by the network and 2) Future complications/errors are prevented by not sending reports (to nodes/functions handling MDT/SON) regarding problems that are already recovered by network.

BRIEF DESCRIPTION OF THE DRAWINGS

The accompanying drawings, which are incorporated herein and form part of the specification, illustrate various embodiments.

DETAILED DESCRIPTION

Figure 1:
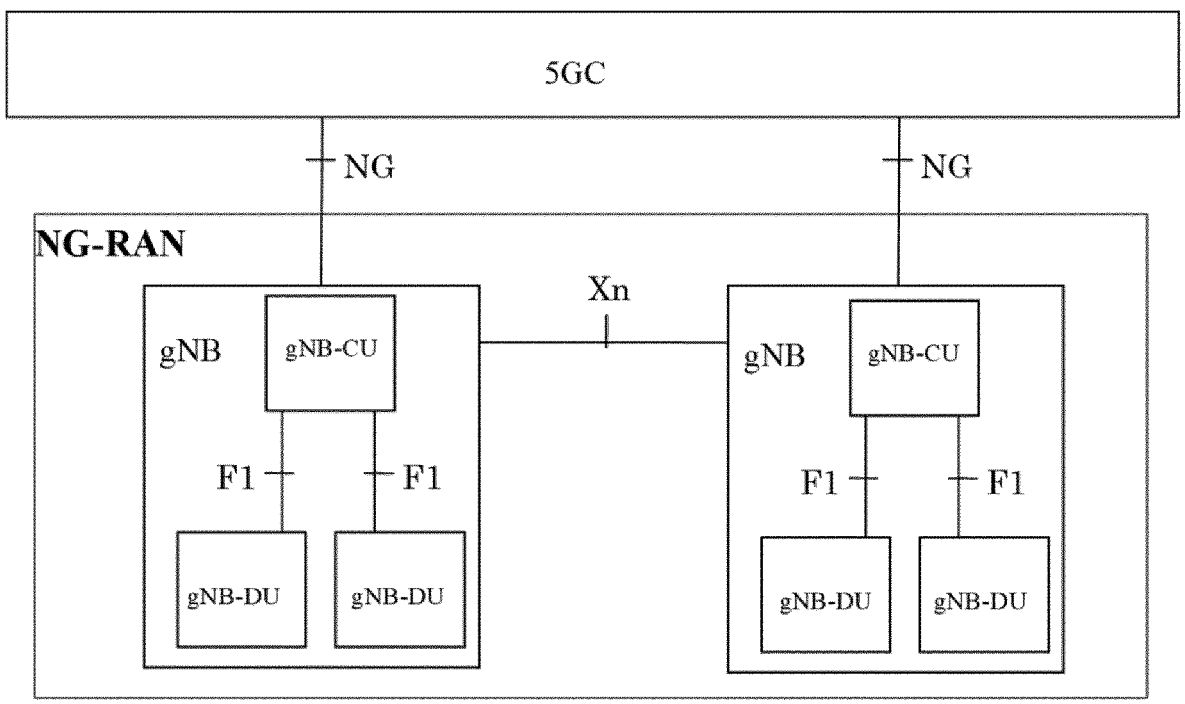
FIG. 1 shows an exemplary 5G RAN (NG-RAN) architecture.
Figure 2:
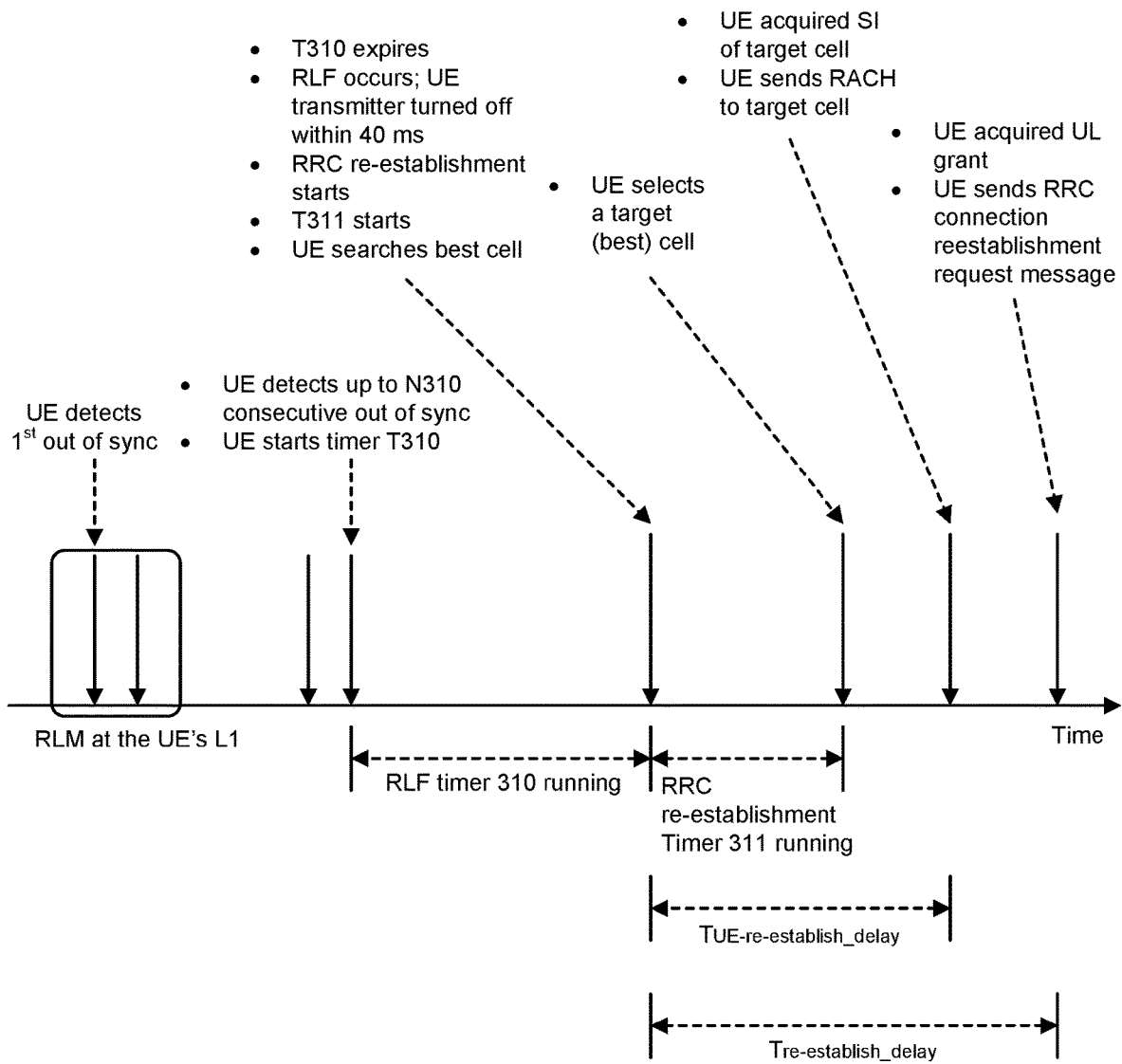
FIG. 2 shows higher layer RLF related procedures in LTE.

1. Example Realizations Related to Deleting the RLF Report 1.1 Deleting the RLF Report on Receiving an RRCReconfiguration Containing reconfigurationWithSync.

1.1.1 The Deletion is Done in the Reconfiguration with Sync Procedure

In one embodiment, the UE shall perform the actions specified in the table below to execute a reconfiguration with sync.

1> if the AS security is not activated, perform the actions upon going to RRC_IDLE as
specified in 5.3.11 with the release cause 'other' upon which the procedure ends;
1> if dapsConfig is not configured for any DRB:
    2> stop timer T310 for the corresponding SpCell, if running;
1> stop timer T312 for the corresponding SpCell, if running;
1> start timer T304 for the corresponding SpCell with the timer value set to t304, as included
in the reconfigurationWithSync;
1> if the frequencyInfoDL is included:
    2> consider the target SpCell to be one on the SSB frequency indicated by the
frequencyInfoDL with a physical cell identity indicated by the physCellId;
1> else:

2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1 for the target;
1> acquire the MIB of the target, which is scheduled as specified in TS 38.213 [13];
NOTE 1: The UE should perform the reconfiguration with sync as soon as possible following the reception of the RRC message triggering the reconfiguration with sync, which could be before confirming successful reception (HARQ and ARQ) of this message.
NOTE 2: The UE may omit reading the MIB if the UE already has the required timing information, or the timing information is not needed for random access.
1> If dapsConfig is configured for any DRB:
  2> create a MAC entity for the target with the same configuration as the MAC entity for the source;
  2> for each DRB with dapsHO-Config:
    3> establish an RLC entity or entities for the target, with the same configurations as for the sourcePCell;
    3> establish the logical channel for the target PCell, with the same configurations as for the source;
  2> for each DRB without dapsHO-Config:
    3> associate the RLC entity, and the associated logical channel, to the target PCell;
  2> for each SRB:
    3> establish an RLC entity or entities for the target, with the same configurations as for the source;
    3> establish the logical channel for the target PCell, with the same configurations as for the source;
  2> suspend SRBs for the source;
NOTE 3: A UE configured with DAPS, stops following operations in source: system information updates, short messages (for NR) and paging.
  2> apply the value of the newUE-Identity as the C-RNTI in the target;
  2> configure lower layers for the target in accordance with the received spCellConfigCommon;
  2> configure lower layers for the target in accordance with any additional fields, not covered in the previous, if included in the received reconfiguration WithSync.
1> else:
  2> reset the MAC entity of this cell group;
  2> consider the SCell(s) of this cell group, if configured, that are not included in the SCellsToAddModList in the RRCReconfiguration message, to be in deactivated state;
  2> apply the value of the newUE-Identity as the C-RNTI for this cell group;
  2> configure lower layers in accordance with the received spCellConfigCommon;
  2> configure lower layers in accordance with any additional fields, not covered in the previous, if included in the received reconfigurationWithSync.
    2> if this cell group is the MCG
      3> if timer T316 is running;
        4> clear the information included in VarRLF-Report, if any
        4> resume MCG transmission, if suspended

1.1.2 The Deletion is Done in the Reconfiguration Procedure

In some rare cases, reconfigurationWithSync procedure may be performed successfully, but there could be a failure (e.g. reconfiguration failure) while handling/compiling the other information contained in the RRCReconfiguration message. Thus, one alternative is to wait until the preparation of the sending of the complete message before deleting the RLF report. Accordingly, in one embodiment the UE performs the following actions upon reception of the RRCReconfiguration, or upon execution of the conditional configuration (CHO or CPC):

1> set the content of the RRCReconfigurationComplete message as follows:
    ....
  2> if the UE has radio link failure or handover failure information available in VarRLF-Report of TS 36.331 [10] and if the UE is capable of cross-RAT RLF reporting and if the RPLMN is included in plmn-IdentityList stored in VarRLF-Report of TS 36.331 [10]:
    3> If the RRCReconfiguration message was received in response to an MCGFailureInformation
      4> clear the information included in VarRLF-Report, if any
    3> else
      4> include rlf-InfoAvailable in the RRCReconfigurationComplete message;
    ....

1.2 Deleting the RLF Report on Receiving an RRCRelease

In one embodiment, when the UE receives RRCRelease message the UE performs a process that includes: 1) stop timer T380, if running; 2) stop timer T320, if running; 3) determine if timer T316 is running; and 4) if it is determined that the time is running, step the timer and clear the information included in VarRLF-Report, if any.

1.3 Deleting the RLF Report on Receiving of MobilityFromNR

In on embodiment, the UE performs the following steps when the UE receives the MobilityFromNRCommand:

1> if T390 is running:
  2> stop timer T390 for all access categories;
  2> perform the actions as specified in 5.3.14.4 of TS 38.331;
1> if the targetRAT-Type is set to eutra:
  2> consider inter-RAT mobility as initiated towards E-UTRA;
  2> forward the nas-SecurityParamFromNR to the upper layers, if included;
1> if timer T316 is running
  2> stop time T316
  2> clear the information included in VarRLF-Report, if any
1> if the targetRAT-Type is set to utra-fdd:
  2> consider inter-RAT mobility as initiated towards UTRA-FDD;
  2> forward the nas-SecurityParamFromNR to the upper layers, if included;

1> access the target cell indicated in the inter-RAT message in accordance with the specifications of the target RAT.

As the current RRC specification already captures the storage of the RLF report in the UE internal memory (e.g., in the UE variable named varRLF-Report, which is defined in section 7.4 of TS 38.331 as containing an "RLF-report-r16" (also defined in TS 38.311) and a PLMN-IdentitiyList) when the UE declares MCG failure (UE stores RLF report, suspends MCG and then the UE sends the MCGFailureIndication message), this disclosure proposes a set of methods wherein the UE can clear the information included in the RLF report (e.g., delete the RLF report) based on the result of the MCG failure recovery.

For example, in one embodiment the UE clears the contents of varRLF-Report if the UE receives a reconfigurationWithSync (within an RRCReconfiguration message) in response to a MCGFailureInformation message and while the MCG is suspended. When this happens, the UE follows legacy operations such as stopping the timer T316 and performs the actions related to reconfigurationWithSync procedure and resumes MCG in the new PCell. We note that the RLF report needs to be cleared only after the reconfiguration with sync procedure (i.e., handover command) was successfully performed.

In another embodiment, the UE clears the contents of varRLF-Report if the UE receives an RRCRelease message in response to a MCGFailureInformation message and while the MCG is suspended. When this happens, the UE stops T316 and performs the state transition to IDLE/INACTIVE as configured in the RRCRelease message and performs the actions upon going to IDLE/INACTIVE.

In another embodiment, the UE clears the contents of varRLF-Report if the UE receives a MobilityFromNR/MobilityFromEUTRA message in response to a MCGFailureInformation and while the MCG is suspended. When this happens, the UE stops T316 and performs the actions related to handover procedure as configured in mobilityControlInfo/ reconfigurationWithSync and resumes MCG in the new PCell in LTE/NR. We note that the RLF report needs to be cleared only after the reconfiguration with sync procedure (i.e., handover command) was successfully performed.

Figure 4:
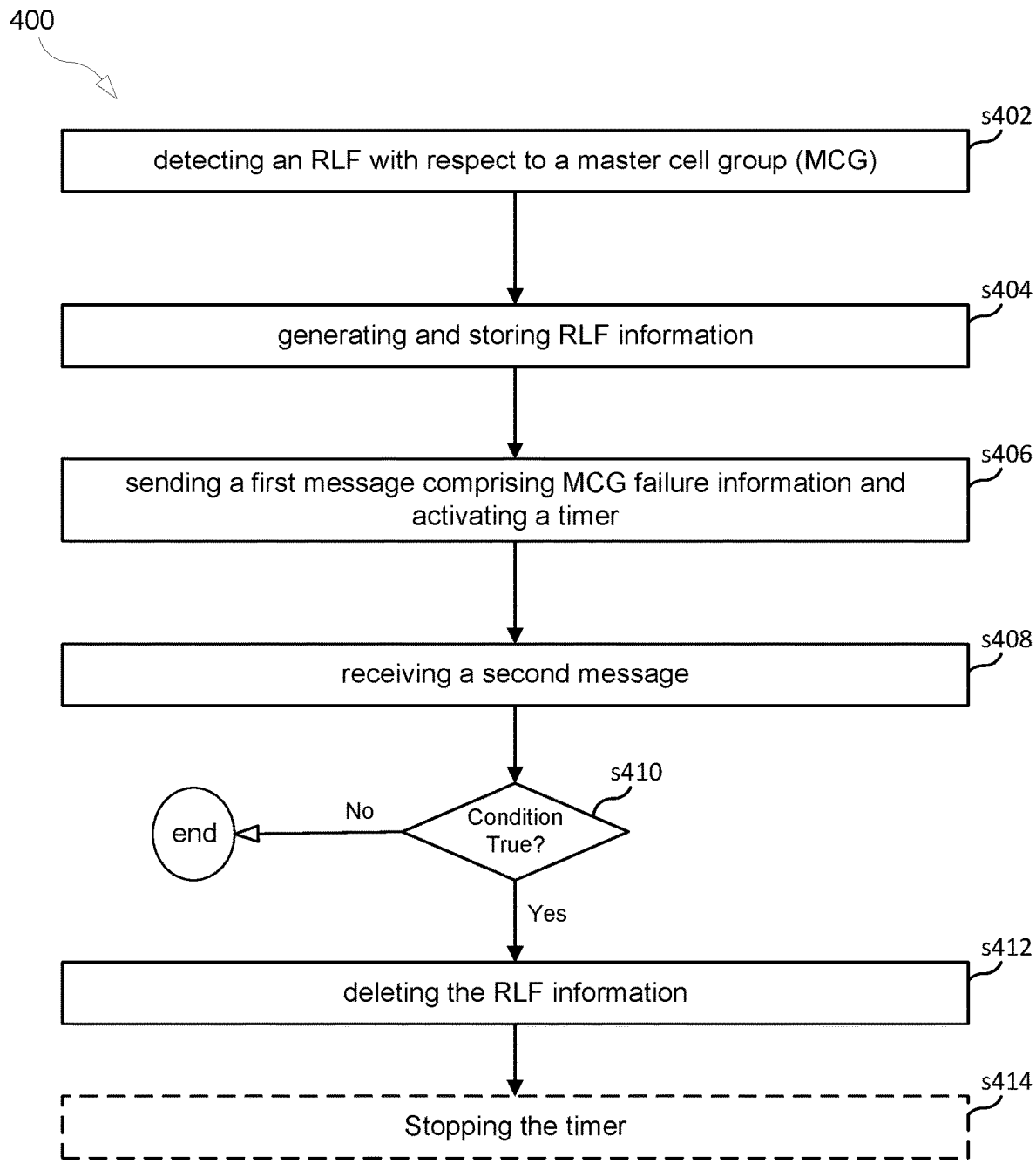
FIG. 4 is a process according to some embodiments.

FIG. 4 is a flowchart illustrating a process 400, according to an embodiment, for reporting RLF information. Process 400 may begin in step s402.

Figure 3:
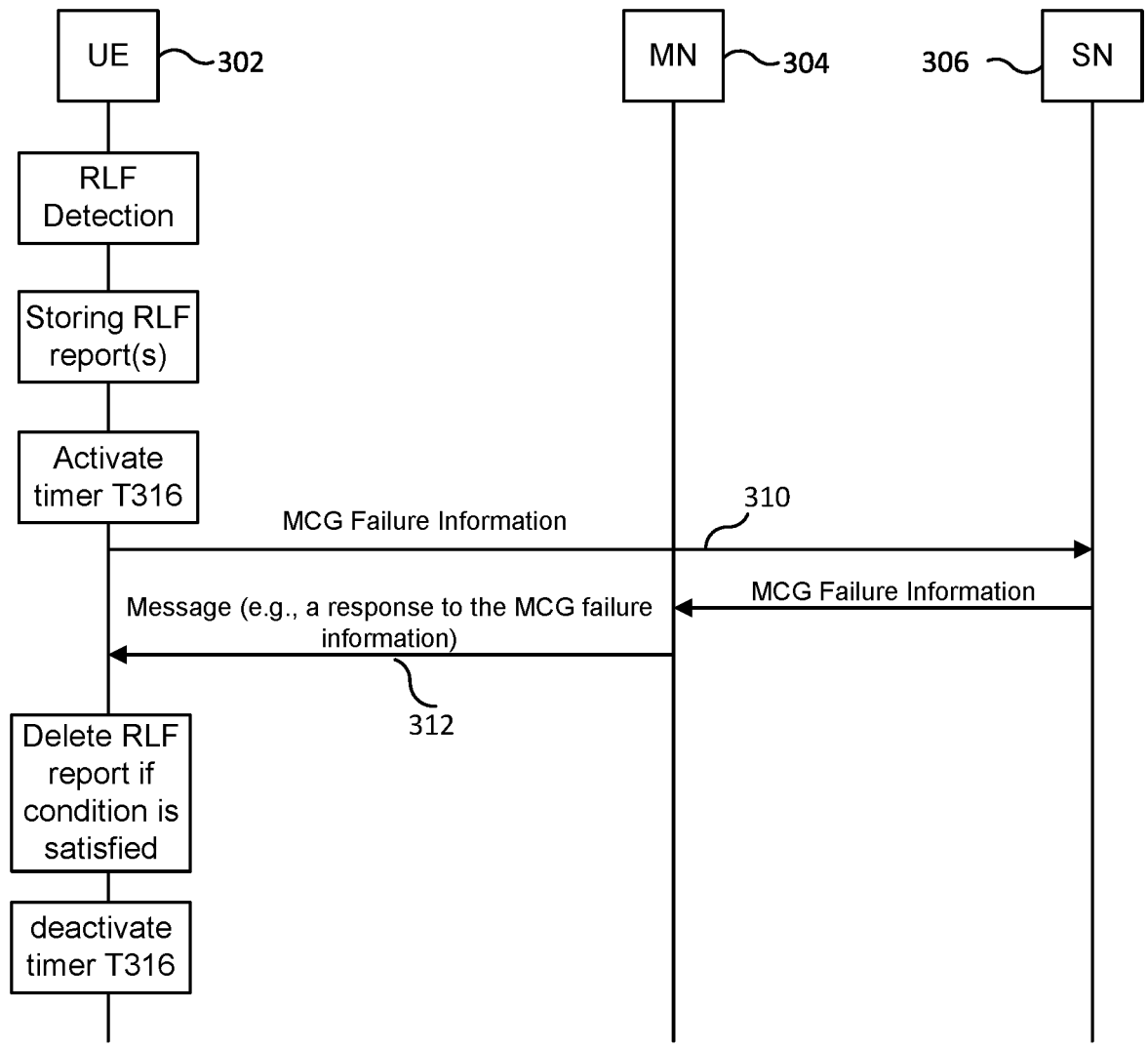
FIG. 3 is a message flow diagram according to an embodiment.

Step s402 comprises a UE 302 (see FIG. 3) detecting an RLF with respect to a master cell group (MCG).

Step s404 comprises the UE, after detecting the RLF, generating and storing RLF information. For example, storing the RLF information comprises storing the RLF information in the variable VarRLF-Report.

Step s406 comprises the UE activating a timer (e.g., the T316 timer) (i.e., the timer starts running and will expire (stop running) after a certain amount of time has elapsed) and sending to a master node (MN) 304 of the MCG, via a secondary node (SN), a first message 310 (see FIG. 3) comprising MCG failure information (e.g., the RLF information).

Step s408 comprises the UE receiving a second message 312 (e.g., second message 312 is sent in response to message 310).

Step s410 comprises the UE, in response to receiving second message 312, determining whether a condition is satisfied, which determining comprises determining whether the timer is still running.

Step s412 comprises the UE deleting the RLF information as a result of determining that the condition is satisfied (e.g., as a result of determining that the timer is still running or as a result of determining that the time is still running and determining that the second message 312 is a particular message). In one embodiment deleting the RLF information comprises clearing the RLF related information from the VarRLF-Report.

Step s414 (optional) comprises the UE deactivating (stopping) the timer.

In some embodiments, second message 312 is one of: i) an RRCReconfiguration message with a reconfigurationWithSync, ii) an RRCRelease message, iii) a MobilityFromNR message, iv) an RRCConnectionReconfigurationMessage with mobilityControlInfo, v) an RRCConnectionRelease message, or vi) a MobilityFromEUTRA message.

Figure 5:
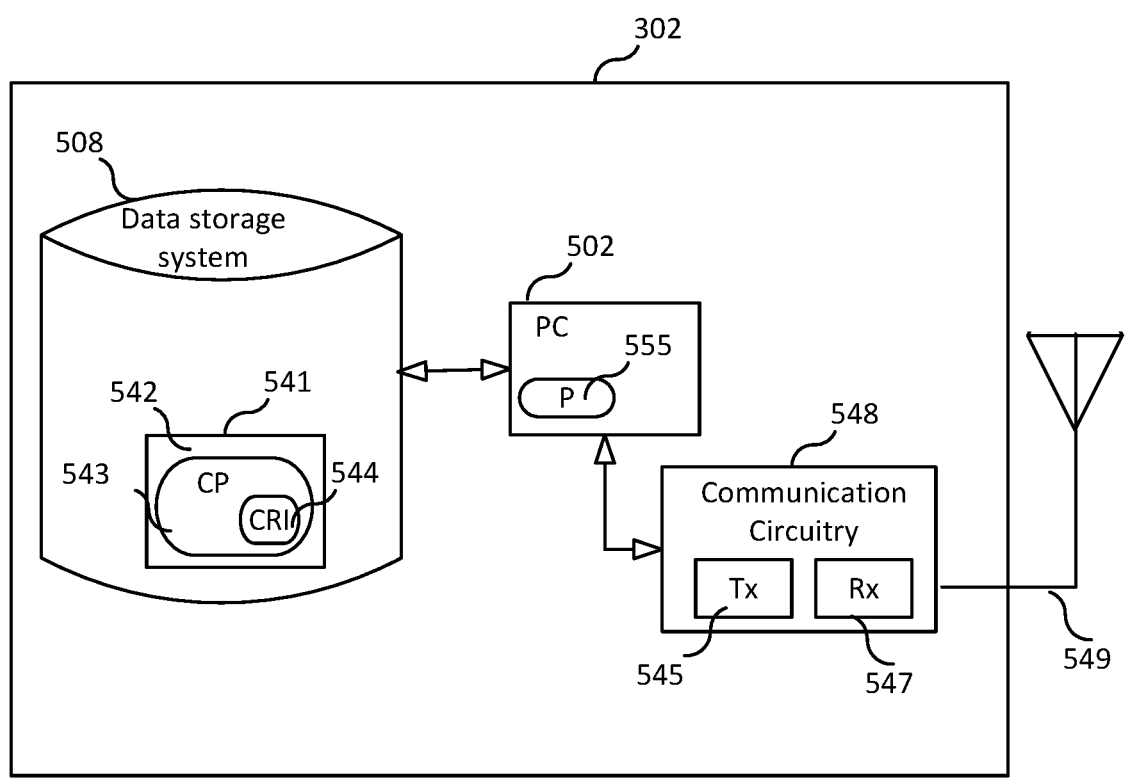
FIG. 5 shows a UE according to some embodiments.

FIG. 5 is a block diagram of UE 302, according to some embodiments. As shown in FIG. 5, UE 302 may comprise: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like); communication circuitry 548, which is coupled to an antenna arrangement 549 comprising one or more antennas and which comprises a transmitter (Tx) 545 and a receiver (Rx) 547 for enabling UE 302 to transmit data and receive data (e.g., wirelessly transmit/receive data); and a local storage unit (a.k.a., "data storage system") 508, which may include one or more non-volatile storage devices and/or one or more volatile storage devices. In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes UE 302 to perform steps described herein (e.g., steps described herein with reference to the flow charts). In other embodiments, UE 302 may be configured to perform steps described herein without the need for code. That is, for example, PC 502 may consist merely of one or more ASICs. Hence, the features of the embodiments described herein may be implemented in hardware and/or software.

Summary of Various Embodiments

A1. A method 400 (see FIG. 4) for reporting RLF information. The method includes: a user equipment, UE 302 detecting s402 an RLF with respect to an MCG; in response to detecting the RLF with respect to the MCG, the UE storing s404 RLF information; the UE activating a timer and sending s406 a first message 310 comprising MCG failure information (e.g., the RLF information); after sending the first message and activating the timer, the UE receiving s408 a second message 312 (e.g., the second message 312 is sent in response to the first message 310 (e.g., in response to the MCG failure information contained in the first message)); the UE, in response to receiving the second message 312, determining s410 that a condition is satisfied, wherein determining that the condition is satisfied comprises at least determining (s410) that the timer is still running; and as a result of determining that the condition is satisfied, the UE deleting s412 the RLF information.

A2. The method of embodiment A1, further comprising the UE deactivating s414 the timer in response to receiving the second message 312.

A3. The method of embodiment A1 or A2, wherein the second message 312 is one of: i) an RRCReconfiguration message with a reconfigurationWithSync, ii) an RRCRelease message, iii) a MobilityFromNR message, iv) an RRCConnectionReconfigurationMessage with mobilityControlInfo, v) an RRCConnectionRelease message, or vi) a MobilityFromEUTRA message.

A4. The method of any one of the above embodiments, wherein determining that the condition is satisfied further comprises the UE determining that the second message is an RRC message containing a reconfiguration with synchronization indicator (e.g., an RRCReconfiguration message containing a ReconfigurationWithSync information element (IE)), wherein the UE performs the deleting step as a result of determining that the timer is still running and determining that the second message is an RRC message containing a reconfiguration with synchronization indicator.

A5. The method of any one of embodiments A1-A3, wherein determining that the condition is satisfied further comprises the UE determining that the second message is a release message (e.g., an RRCRelease message), wherein the UE performs the deleting step as a result of determining that the timer is still running and determining that the second message is a release message.

A6. The method of any one of embodiments A1-A3, wherein determining that the condition is satisfied further comprises the UE determining that the second message is one of: i) a MobilityFromNR message, ii) an RRCConnectionReconfigurationMessage with mobilityControlInfo, iii) an RRCConnectionRelease message, or iv) a MobilityFromEUTRA message, wherein the UE performs the deleting step as a result of determining that the timer is still running and determining that the second message is one of: i) a MobilityFromNR message, ii) an RRCConnectionReconfigurationMessage with mobilityControlInfo, iii) an RRCConnectionRelease message, or iv) a MobilityFromEUTRA message.

B1. A computer program 543 comprising instructions 544 which when executed by processing circuitry 502 of a user equipment, UE 302 causes the UE 302 to perform the method of any one of the above embodiments.

B2. A carrier containing the computer program of embodiment B1, wherein the carrier is one of an electronic signal, an optical signal, a radio signal, and a computer readable storage medium 542.

C1. A user equipment, UE 302, the UE being adapted to perform the method of any one of the above embodiments.

D1. A user equipment, UE 302, the UE comprising: processing circuitry 502; and a memory 542, said memory containing instructions 544 executable by said processing circuitry, whereby said UE is operative to perform the method of any one of the above embodiments.

E1. A method executed by a UE for reporting radio link failure (RLF) related information. The UE is operating in dual connectivity between a master node (MN) and a secondary node (SN), where the MN is providing a set of serving cells, a master cell group (MCG), and the SN is providing a set of serving cells, a secondary cell group (SCG). The method includes: 1) the UE detecting an RLF on the MCG; 2) the UE generating an RLF report and storing it; and 3) the UE initiating the MCG failure recovery procedure.

E2. The method of embodiment E1, wherein initiating the MCG failure recovery procedure comprises: the UE starting a timer T316; the UE preparing an MCG Failure Information, including information about the failure cause as well as measurements (in serving cells as well as neighbor cells) at the time of failure; and the UE sending the MCG failure information to the MN, via the SN (using either the secondary leg of split SRB1 or SRB3, if configured). After determining that the network has responded to the MCG failure information before T316 has expired, the UE may delete the RLF report. In some embodiments, determining that the network has responded to the MCG failure information before T316 has expired comprise the UE receiving one of the following: A) in the case the MN is an NR node: i) an RRCReconfiguration message with a reconfigurationWithSync, ii) an RRCRelease message, or iii) a MobilityFromNR message or B) in the case the MN is an LTE node: i) an RRCConnectionReconfigurationMessage with mobilityControlInfo, ii) an RRCConnectionRelease message, or iii) a MobilityFromEUTRA message. In one alternative, the RLF report is deleted in all the above cases (i.e. on receiving of the reconfiguration, release or mobilityFromNR/mobilityFromEUTRA messages). In another alternative, the RLF report is not deleted in the reception of the release message. In another alternative, the RLF report is not deleted in the reception of the mobilityFromNR/mobilityFromLTE message.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

ACK Acknowledgement
AP Application Protocol
BSR Buffer Status Report
BWP Bandwidth Part
C-RNTI Cell Radio Network Temporary Identifier
CA Carrier Aggregation
CE Control Element
CP Control Plane
CQI Channel Quality Indicator
DC Dual Connectivity
DCI Downlink Control Information
DL Downlink
DRB Data Radio Bearer
eNB (EUTRAN) base station E-RAB EUTRAN Radio Access Bearer
FDD Frequency Division Duplex
gNB NR base station
GTP-U GPRS Tunneling Protocol-User Plane
IP Internet Protocol
LTE Long Term Evolution
MCG Master Cell Group
MAC Medium Access Control
MeNB Master eNB
MgNB Master gNB
MN Master Node
NACK Negative Acknowledgement
NR New Radio
PDCP Packet Data Convergence Protocol
PCell Primary Cell
PCI Physical Cell Identity
PSCell Primary SCell
PUSCH Phyical Uplink Shared Channel
RLC Radio Link Control
RLF Radio Link Failure
RRC Radio Resource Control
SCell Secondary Cell
SCG Secondary Cell Group
SCTP Stream Control Transmission Protocol
SeNB Secondary eNB
SINR Signal to Interference plus Noise Ratio
SN Secondary Node
SR Scheduling Request
SRB Signaling Radio Bearer
SUL Supplementary uplink
TDD Time Division Duplex
TEID Tunnel Endpoint IDentifier
TNL Transport Network Layer
UCI Uplink Control Information
UDP User Datagram Protocol
UE User Equipment
UL Uplink
UP User Plane
URLLC Ultra Reliable Low Latency Communication
X2 Interface between base stations

The invention claimed is:

1. A method for reporting radio link failure (RLF) information, the method comprising:
 a user equipment (UE) detecting an RLF with respect to a master cell group (MCG);
 in response to detecting the RLF with respect to the MCG, the UE storing RLF information;
 the UE sending a first message comprising MCG failure information and starting a timer;
 after sending the first message and starting the timer, the UE receiving a second message;
 the UE, in response to receiving the second message, determining that the timer is still running; and
 as a result of determining that the that the timer is still running, the UE deleting the RLF information, wherein the second message is one of:
  an RRC message containing a reconfiguration with synchronization indicator;
  a MobilityFromEUTRA message;
  a MobilityFromNR message; or
  an RRCConnectionReconfigurationMessage with mobilityControlInfo.

2. The method of claim 1, further comprising the UE stopping the timer in response to receiving the second message.

3. The method of claim 1, wherein the second message is an RRCReconfiguration message containing a Reconfiguration WithSync information element.

4. The method of claim 1, wherein deleting the RLF information comprises deleting the RLF information in a UE internal memory.

5. The method of claim 1, wherein
 the RLF information is captured in a UE variable referred to as VarRLF-Report according to 3GPP, and
 deleting the RLF information comprises deleting the RLF information included in the Var-RLF-Report.

6. The method of claim 1, wherein the MCG failure information comprises the RLF information.

7. A non-transitory computer readable storage medium storing a computer program comprising instructions which when executed by processing circuitry of a user equipment (UE) causes the UE to perform a method comprising:
 detecting a radio link failure (RLF) with respect to a master cell group (MCG;
 in response to detecting the RLF with respect to the MCG, storing RLF information;
 sending a first message comprising MCG failure information and starting a timer;
 after sending the first message and starting the timer, receiving a second message;
 in response to receiving the second message, determining that the timer is still running; and
 as a result of determining that the that the timer is still running, the UE deleting the RLF information, wherein the second message is one of:
  an RRC message containing a reconfiguration with synchronization indicator;
  a MobilityFromEUTRA message;
  a MobilityFromNR message; or
  an RRCConnectionReconfigurationMessage with mobilityControlInfo.

8. A user equipment (UE), the UE comprising:
 processing circuitry; and
 a memory, said memory containing instructions executable by said processing circuitry, wherein the UE is configured to perform a method comprising:
 detecting a radio link failure (RLF) with respect to a master cell group (MCG;
 in response to detecting the RLF with respect to the MCG, storing RLF information;
 sending a first message comprising MCG failure information and starting a timer;
 after sending the first message and starting the timer, receiving a second message;
 in response to receiving the second message, determining that the timer is still running; and
 as a result of determining that the that the timer is still running, the UE deleting the RLF information, wherein the second message is one of:
  an RRC message containing a reconfiguration with synchronization indicator;
  a MobilityFromEUTRA message;
  a MobilityFromNR message; or
  an RRCConnectionReconfigurationMessage with mobilityControlInfo.

9. The UE of claim 8, wherein the UE is configured to stop the timer in response to receiving the second message.

10. The UE of claim 8, wherein the second message is an RRCReconfiguration message containing a ReconfigurationWithSync information element.

11. The UE of claim 8, wherein deleting the RLF information comprises deleting the RLF information in a UE internal memory.

12. The UE of claim 8, wherein
the UE is configured to capture the RLF information in a UE variable referred to as VarRLF-Report according to 3GPP, and
deleting the RLF information comprises deleting the RLF information included in the Var-RLF-Report.

13. The UE of claim 8, wherein the MCG failure information comprises the RLF information.

* * * * *